Oct. 9, 1923.
W. A. TRAUFLER
BELT SHIFTER
Filed Jan. 30, 1922
1,469,856
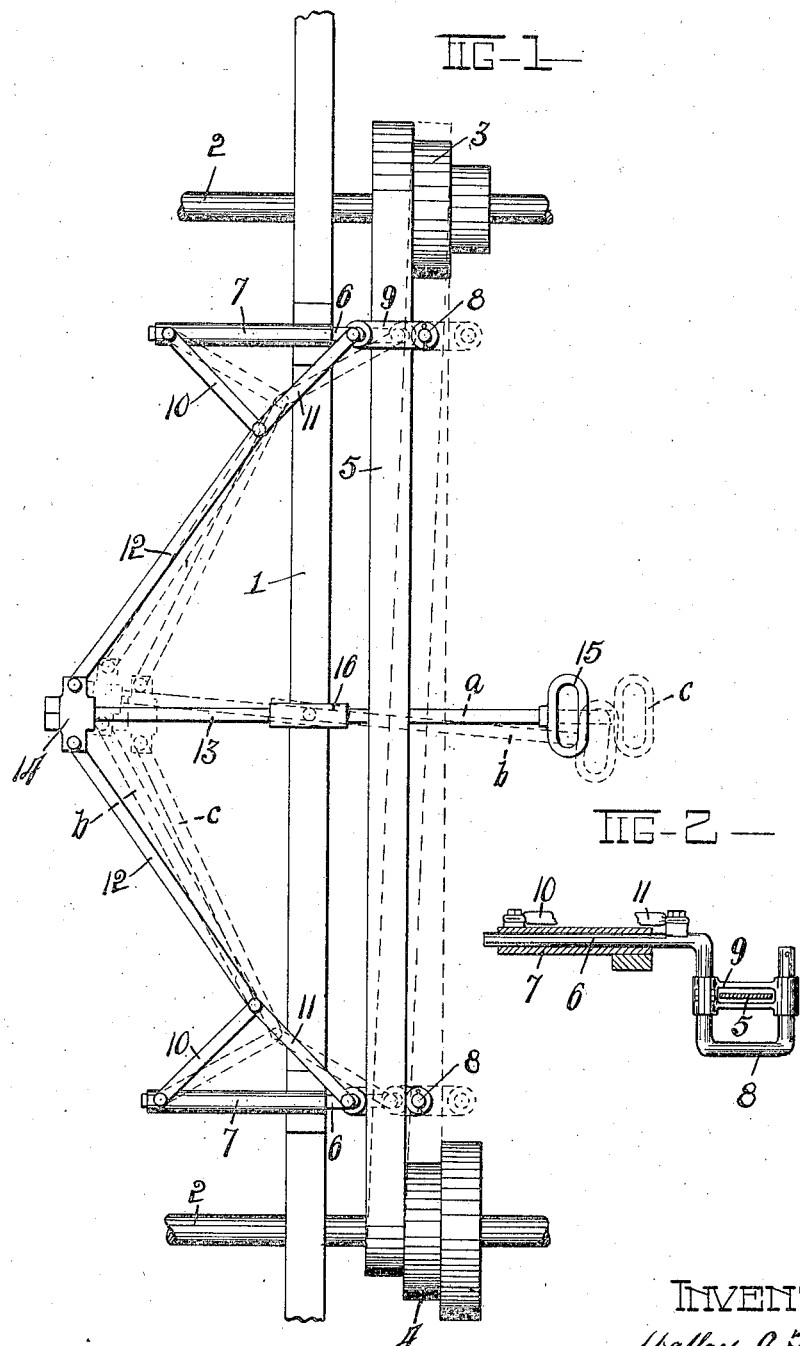
INVENTOR
Wallace A. Traufler,
By Owen Owen & Crampton,
Attys.

Patented Oct. 9, 1923.

1,469,856

UNITED STATES PATENT OFFICE.

WALLACE A. TRAUFLER, OF TOLEDO, OHIO.

BELT SHIFTER.

Application filed January 30, 1922. Serial No. 532,557.

*To all whom it may concern:*

Be it known that I, WALLACE A. TRAUFLER, a citizen of the United States, and a resident of Toledo, county of Lucas, and State of Ohio, have made an Invention Appertaining to a Belt Shifter; and I do hereby declare the following to be a full, clear, and exact description of the invention, such as will enable others skilled in the art to which it appertains to make and use the same, reference being had to the accompanying drawings, and to the characters of reference marked thereon, which form a part of the specification.

This invention relates to belt shifters, and particularly to the class of such devices used in connection with belts mounted on and connecting pulleys of the stepped or cone type.

The object of the invention is the provision of a belt shifter of the class described, which is simple and inexpensive in its construction, is capable of being easily and quickly operated by the manipulation of a single control member to shift the belt in either direction on a pair of connected pulleys.

The invention is fully described in the following specification, and while, in its broader aspect, it is capable of embodiment in numerous forms, a preferred embodiment thereof is illustrated in the accompanying drawings, in which,—

Fig. 1 is an elevation of a belt shifting device embodying the invention in operative connection with a belt connected to stepped pulleys and showing in dotted lines different positions of movement of the same during a belt shifting operation, and Fig. 2 is a side view of one of the belt shifting members, with its carrying means in longitudinal section and with the operating means therefor broken away.

Referring to the drawings, 1 designates a frame-work which is disposed between and may constitute the bearings for a pair of spaced shafts 2, 2, or comprise a frame separate from the means constituting the bearings for the shafts but stationary with respect thereto. A pulley 3 is mounted on one shaft and a pulley 4 is mounted on the other, both pulleys being of stepped or cone form and connected by a belt 5 in the usual manner, so that when the belt is on the portion of the greatest diameter of one pulley it will be on the portion of smaller diameter of the other pulley.

The belt shifting means embodying the invention includes two slide bars or arms 6 mounted in spaced relation longitudinally of the belt with one adjacent to the inner side of each pulley, each slide bar being mounted for reciprocatory movements transverse to the belt in a respective guide 7, which is fixed to the frame 1 and is preferably of elongated form to provide a prolonged bearing for the bar. The end of each slide bar 6 adjacent to the belt is provided with a U-shaped loop 8 disposed transverse to the belt and carrying a slotted cross-bar through which the belt projects for free movements. The cross-bar 9 is slidable on the loop 8 transversely of the bar 6 to move inward and outward with the belt as the space between its lengths varies by reason of the belt passing from one step to another of the adjacent pulley.

A pair of toggle-links 10 and 11 is associated with each slide bar 6, the link 10 being pivotally connected at one end to the guide 7 near its outer end and the link 11 being pivotally connected at one end to the slide bar 6 near its inner or looped end, and the two bars being pivotally connected at their other ends by a common pivot to the adjacent end of a connecting bar 12. It is thus evident that a straightening out movement of a pair of toggle links from the full line position shown in Fig. 1 will impart an outward belt shifting movement to the slide bar 6, and vice versa.

Each bar 12 is pivotally connected at its inner end to the adjacent end of a control handle or member 13, which member, in the present instance, is provided at one end with a cross-head 14 to which the rods 12 are pivoted. The member 13 projects, in the present instance, from its point of connection with the bars 12 across the frame 1 and between the lengths of the belt 5, and terminates at the opposite side of the belt at a distance therefrom in a handle 15. The control member 13, might, however, so far as the operation of the device is concerned, project in the opposite direction, the direction of projection depending on the desired point of control, with respect to the belt. The member 13 is carried by a swivel-guide 16 for rocking movements therewith and longitudinal movements therethrough in a plane longitudinal to the bars 12, the guide being pivoted to the frame 1 or to any other suitable support.

In the operation of the device supposing the belt to be in the full line position shown and it being desired to throw it to the next step on the pulleys, the control member 13 is first pulled longitudinally to effect a partial straightening out of both pairs of toggle-links 10 and 11 during which movement the belt is forced over to the inner side of its run or to a point where it comes in contact with the side wall of the next largest step of the pulley 4. At this point the operator notices a resistance to a further movement of the belt and then throws the free end of the member 13 downward, which causes a straightening out of the upper pair of toggle-links 10 and 11 and a consequent movement of the associated slide bar 6 to shift the adjacent end of the belt down onto the next step of the pulley 3. This movement of the control member, together with the first inward movement thereof, places it and the different parts in the dotted line position designated $b$, the initial full line position being designated $a$. The belt having been released from the large portion of the pulley 3 it is now free to be shifted at the opposite end onto the intermediate elevated portion of the pulley 4, and the operator accomplishes this by moving the control member 13 to the dotted line position $c$, which while leaving the upper slide bar 6 in its shifted position, effects a straightening out of the lower set of toggle links 10 and 11 sufficient to throw the belt onto the central portion of the pulley 4. This operation is repeated for each step of the pulleys and is reversed to shift the belt back from the right to the left on the pulleys, as is apparent. It will be understood that the belt engaging loops of the respective slide bars engage the respective lengths of the belt which pass onto the associated pulley.

It is found in practice that with this device it is an exceedingly easy and simple matter to shift a belt from one step to another on the pulleys and that it can be accomplished in a very rapid manner.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent is—

1. A belt shifter of the class described, having spaced belt engaging slide members spaced lengthwise of the belt, stationary means forming a guide for each slide member, and means having toggle connection with each slide member and with the stationary means adjacent to each slide member and operable both to impart like simultaneous movements and relative movements to the slide members.

2. A belt shifting means of the class described, comprising spaced belt engaging and shifting members movable transverse to the belt, means guiding the movements of said members, a pair of toggle links connecting each member and an adjacent part of the guide means, and operable by straightening out or folding movements thereof to impart reciprocatory belt shifting movements to the connecting members, and means connecting the two sets of toggle links and operable to impart predetermined like or differential movements to the toggle sets.

3. A belt shifter having a pair of belt engaging members spaced longitudinally thereof and shiftable transversely thereof, guide means for the members, unitary means including toggles connecting the members and also attached to the guide means adjacent to each member, and a control means for said connecting means operable to impart like simultaneous movements or predetermined relative belt shifting movements to the members.

4. A belt shifter of the class described, having a pair of spaced belt engaging and shifting members, guide means for the members, and means including toggle links and a control member the latter mounted for rocking and longitudinal reciprocatory movements and operable to impart like movements together or differential movements to the shifting members.

5. A belt shifter of the class described, having a pair of spaced reciprocable belt shifting members, guide means for the members, a set of toggles associated with each member and connecting it and a part of the guide means, a control member disposed intermediate the shifting members, and means connecting the control member to both toggle sets and operable to move the toggle sets to impart like or differential movements to the shifting members.

6. A belt shifter of the class described, having a pair of spaced reciprocable belt shifting members, means guiding the movements of each member, a set of toggle links associated with each member and connecting it to a part of the guide means, a control member mounted intermediate the shifting members for both rocking and longitudinal reciprocatory movements, and means connecting the control member to both toggle sets, whereby a true longitudinal movement of the control member will impart like shifting movements together to the shifting members and a combined rocking and longitudinal movement of the control member will impart predetermined movement to either shifting member.

7. A belt shifter of the class described, having a pair of spaced reciprocally movable belt shifting members, means guiding the movements of each member, a set of toggle links associated with each member and connecting it to an adjacent part of the guide means whereby a straightening movement of each set of toggle links will impart a shifting movement in one direction to the associated shifting member, a control means mounted intermediate the shifting members for differential operating movements, and links connecting the control means to each set of toggle links to cooperate with the toggle links to impart simultaneous or independent shifting movements to the members from movements of the control means.

In testimony whereof I have hereunto signed my name to this specification.

WALLACE A. TRAUFLER.